United States Patent [19]

Mendenhall

[11] Patent Number: 5,305,696
[45] Date of Patent: Apr. 26, 1994

[54] PROCESS AND SYSTEM FOR TREATING CONTAMINATED PARTICULATE SOIL COMPOSITIONS

[76] Inventor: Robert L. Mendenhall, 4420 S. Decatur Blvd., Las Vegas, Nev. 89103

[21] Appl. No.: 956,913

[22] Filed: Oct. 5, 1992

[51] Int. Cl.⁵ .............................................. A47J 36/24
[52] U.S. Cl. ................................... 110/236; 110/246; 110/346; 432/105; 432/14
[58] Field of Search .................. 432/14, 105; 110/246, 110/236, 238, 346

[56] References Cited

U.S. PATENT DOCUMENTS

| | | |
|---|---|---|
| 2,654,592 | 10/1953 | Harris . |
| 3,705,711 | 12/1972 | Seelandt et al. . |
| 4,427,377 | 1/1984 | Dambrine et al. . |
| 4,429,642 | 2/1984 | Deve . |
| 4,648,332 | 3/1987 | Goedhart . |
| 4,648,333 | 3/1987 | Mudd et al. . |
| 4,667,609 | 5/1987 | Hardison et al. . |
| 4,700,638 | 10/1987 | Przewalski . |
| 4,748,921 | 6/1988 | Mendenhall . |
| 4,827,854 | 5/1989 | Collette . |
| 4,957,429 | 9/1990 | Mendenhall . |
| 5,085,581 | 2/1992 | Mendenhall . |
| 5,088,856 | 2/1992 | Yocum ............................. 110/246 |
| 5,188,041 | 2/1993 | Noland et al. ..................... 110/236 |

FOREIGN PATENT DOCUMENTS 3216771  5/1982  Fed. Rep. of Germany .

*Primary Examiner*—Henry C. Yuen
*Attorney, Agent, or Firm*—Jerry R. Seiler

[57] ABSTRACT

An improved process and apparatus for treating particulate soil composition to remove volatilizable organic materials therefrom comprises separating fine particles of the soil from a gaseous mixture in a drum containing the fine particles and volatilized organic material, directing the separated fine particle heat exchange apparatus, indirectly heating the fine particles therein with hot exhaust gas to volatilize organic materials, and recovering the fine particles. The hot exhaust gas for heating the fine particles in the heat exchange apparatus is obtained from a furnace used to combust volatilized organic material.

9 Claims, 2 Drawing Sheets

PROCESS AND SYSTEM FOR TREATING CONTAMINATED PARTICULATE SOIL COMPOSITIONS

BACKGROUND OF THE INVENTION

In my patents 4,957,429, and 5,085,581 there are disclosed method and apparatus for removing volatilizable organic materials from particulate mineral compositions. The aforesaid process and apparatus are generally quite suitable for treating particulate compositions in which the amount of fine particles are below about 25% of the total recoverable mass of material. In the process, fine particles are separated from a gaseous mixture recovered from the heating drum, and returned to the drum and further heated along with the coarse particles for removal of volatilizable organic material. It has been found that in treating contaminated soil compositions, where the amount of fine particles which pass a size 40 U.S. series sieve is substantial, the continuous return of fines to the heating drum reduces production efficiency. The efficiency drop becomes especially problematic where the amount of fines is over about 50% of the recoverable soil composition mass, and where the fines present are above about 60% or 70%, production efficiency drops dramatically. It is to an apparatus and process for treating contaminated soils which are relatively high in fine soil particulates that the present invention is directed.

SUMMARY OF THE INVENTION

According to the present invention, the fine contaminated soil particles separated from the gaseous components in the gaseous stream recovered from the heating drum for the contaminated soil feed stocks, are heated in an indirect heating apparatus for volatilization of the soil contaminates. The invention includes an improved system including components for treating the fine contaminated particles, as well as a process for removing the organic contaminates.

DETAILED DESCRIPTION OF THE PREFERRED EMBODIMENTS

The present invention is directed to a process and apparatus for removing volatilizable organic materials, typically hydrocarbons and the like, from fine soil particles, which, for the purpose of this invention, are defined as those particles which will pass a size 40 U.S. series sieve. Such particles are often referred to in the art as "40 minus" particles. The U.S. series size 40 sieve opening is 0.0165 inches or 0.42 millimeters. The apparatus and process of the present invention are especially suitable for particulate soil compositions having a significant amount of such fine particles, hereinafter further referred to as "fines", of above about 25%, and particularly above about 50%, of the total recoverable mass of the particulate soil material to be treated. However, it is to be understood that the invention is not specifically limited to the treatment of such materials. Thus, the apparatus and process may be used for separating volatilizable materials from any solid particulates capable of being heated sufficiently in the indirect heating apparatus component of the invention.

The soils from which the organic contaminates are removed according to the present invention are particulate mineral materials from any source, and generally include sands, clays, dried drilling muds, pumice, etc., and other particulate earthen or soil compositions. However, the source of such soil materials or compositions is not limiting to the invention.

The organic contaminates to be removed according to the process of the invention comprise volatilizable materials, typically, but not exclusively, organic compositions. Such organic materials include not only the hydrocarbons but other organic compounds, for example, alcohols, phenols, ethers, acids, esters, aldehydes, ketones, waxes, fats, oils, amines, sulphides, phosphates, etc., which are capable of being volatilized from the inorganic soil particles and which may be burned or oxidized in a furnace or after-burner, or otherwise treated for removal from a gas stream that may be safely exhausted to atmosphere. Such materials are often found in the soils, ground or earth around service stations, railroad stations, switching yards, industrial and chemical plants, airports, refineries, and other areas where the soil has been exposed to such materials. The sources of these contaminants as well as the particular materials are disclosed in my aforesaid patents as well as my patent 4,748,921, the relevant portions of which are incorporated herein by reference.

Figure 1:
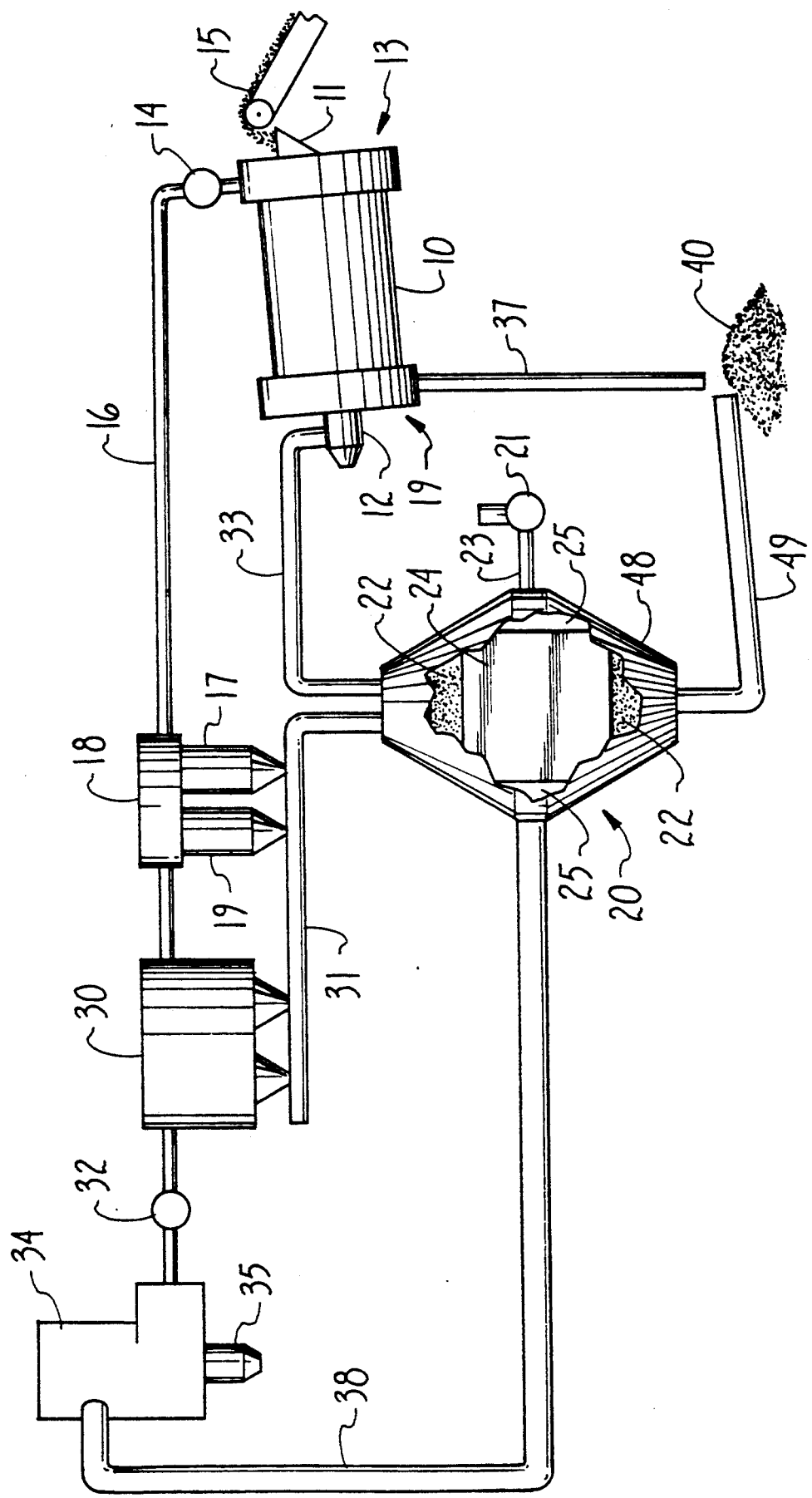
FIG. 1 is a schematic drawing illustrating the components of the system of the invention.
Figure 2:
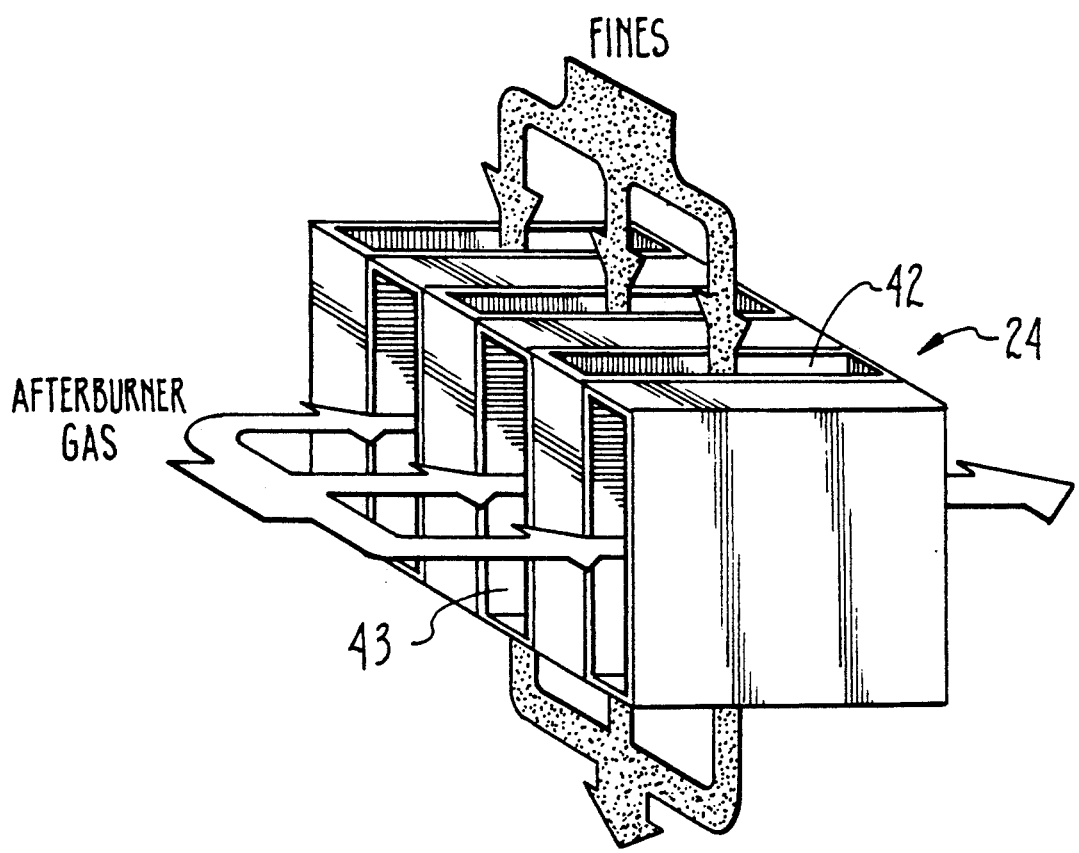
FIG. 2 is an enlarged schematic illustration of the improved indirect heating apparatus for separating volatilizable organic material from the fine soil composition particles.

Referring to FIG. 1, contaminated soil 15 is introduced into a rotatable drum 10 provided with a burner 12. A conventional rotatable, cylindrical dryer, well known to those skilled in the art for drying aggregates, and often referred to as a drum dryer, may be used. Such apparatus is provided with a hopper 11 or similar feed or chute means for introducing the composition into the drum, at one end, with the drum being heated by a burner 12. As the drum is rotated, the composition in the drum is lifted along the interior surface of the rotating drum and cascaded though the hot gases of combustion which are directed along the length of the drum from the burner to the opposite end. As illustrated, a counter flow drum is preferred, in which the hot gases of combustion from the burner are directed along the length of the drum in the opposite direction from the flow of composition particles as the drum is rotated. The drum is tilted with respect to horizontal and the contaminated particulate soil composition 15, which comprises both coarse and fine particles, is introduced at the elevated drum end 13 via hopper 11. The composition is gradually heated as the particles are exposed to the hot gases as they cascade gravitationally from input end 13 to the opposite output end of the drum 19. Flights or trays, known in the art, are provided along the drum interior for alternately lifting and dropping the particulate soil particles whereby they cascade through the hot gases and thus are gradually heated.

As the contaminated particles become heated in the hot gas stream, the gaseous mixture created in the drum includes not only the hot gases of combustion, but the volatilized organic materials from the heated particles, water vapor that is also volatilized from the soil composition, and the fine inorganic particles which become air-borne in the draft of the gaseous mixture drawn out of the end 13 of the drum by the exhaust system. An exhaust fan 14 or similar means such as a blower or the like, creates a partial vacuum or pressure drop at end 13 of the drum relative to the burner end 19.

The relatively coarse soil particles, those which will not pass a 40 U.S. series sieve, are gradually directed toward the output end 19 of drum 10 and recovered through conduit 37, or equivalent means which may include a conveyer, a chute, or the like. The specific temperature which the coarse particles are heated for removal of substantially all of the organic material will depend on the residence time of the composition in the drum, as well as the amount of heat directed into the drum. The drum may be tilted more or less with respect to horizontal, which will increase or decrease the residence time it takes the composition to travel from input end 13 to output end 19. By heating the coarse composition particles to temperatures between about 500°-800° F., substantially all of the volatilizable organic materials will be removed. If necessary, the coarse particles recovered may be run through the drum again for further heating and removal of contaminants.

The fine composition particles which become airborne and mixed with the gases removed from the drum in the exhaust stream via exhaust fan 14 and conduit 16 are at the temperature of the gas stream, which is typically about 300° F.–500° F., somewhat less than the temperature of the coarse composition particles recovered at the relatively hot end of the drum 19. Thus, these fines recovered from the drum in the exhaust gas stream retain a substantial amount of contaminants. This mixture of gases and fines is directed to components for separating the solid inorganic particulates from the gaseous compositions. Any suitable filtration devices and/or other equivalent means for separating these materials may be used. For example, as illustrated, a cyclone apparatus 18 having a pair of cyclone separators 17 and 19 may be used. A dry cyclone separator is a very efficient primary means for separating a majority of the particulate mass from the gaseous stream. Such a cyclone separator or collector may include multiple cyclone tubes in various arrangements and combinations, well known to those skilled in the art. In such an apparatus, the gas/particulate mixture is treated centrifugally causing the solid particles to travel to the bottom of the cyclones where they are recovered, and directed into collector pipe 31. Typically, the lower limit of the size of fines efficiently separated by cyclone filters is generally between about 5 and about 10 microns. Further separation and recovery of additional and smaller fines may be further carried out by directing the gaseous composition recovered from the cyclone apparatus to a secondary separator such as a bag house 30, well known to those skilled in the art. Such a bag house separator, for example of pulsating or pulsing cycle design, will normally recover between about 75% and about 99% of the smaller fines, for example, having an average diameter between about 1 and 10 microns. Although such small recoverable solid particulates may account for a relatively small amount of the total particulate mass, because of the relatively large surface/mass ratio of these smaller particulates, they contain a substantial amount of the volatilizable organic material to be removed in the process. These small dust particles settle to the bottom of the bag house 30 and are also recovered via a collector pipe 31, or similar conduit where they are combined with the particles obtained from the previously described primary cyclone separator system. Although the bag house and cyclone separators are shown in the preferred embodiment, they are shown by way of example only, and other suitable equivalent components for separating the solid particulate fines from the gaseous materials may be used.

The separated gas components from the bag house 30 are then directed to an after-burner furnace 34 using an exhaust fan 32, or similar means for continually pulling the exhaust gas materials which contain the volatilizable organic material through the exhaust system. Furnace 34 is heated by a burner 35 or other combustion means to substantially burn and oxidize or combust all of the volatilizable organic materials. The exhaust gases from such an after-burner or furnace may be exhausted to atmosphere. A preferred embodiment of the invention includes utilizing at least a portion of the exhaust gas from the furnace 34 which has a relatively high temperature, preferably above 1200° F., and usually above about 1500° F., to further heat the fine solid particles which have been recovered by the primary and secondary fines separation equipment described above.

According to an important feature of the invention, the fine solid (soil) particles which have been separated from the coarse particles and recovered from the gaseous stream removed from the rotatable drum 10 are directed to an indirect heating apparatus for further heating those fine particles to a temperature sufficient to remove substantially all of the volatilizable hydrocarbon or organic material which was not previously separated. A problem in treating soil composition that has a substantial amount of fines, for example, above about 25%, and even more critically above about 50% of the recoverable solid particulate mass, is that because of the 300°–400° F. temperature limitations at which the fine particles can be treated in a bag house or similar filtration system, contaminated particles at those temperatures retain significant amounts of organic material. To remove such volatilizable material it is necessary to further heat the fines to a temperature of between about 500° F. and about 800° F.

According to the present invention, the fines recovered from the particulate separators are directed to an indirect heating apparatus 20. Such an apparatus comprises a housing or outer shell 48 enclosing a cross-flow heat exchanger incorporating a plurality of first channels 42 through which the particles are directed, and a plurality of second channels 43 through which hot gases from the after-burner furnace are directed. In the system illustrated to FIG. 1, the recovered fines are directed along collector pipe 31 and dropped into the heating apparatus 20 at the upper end and pass gravitationally through the plurality of first channels 42. Simultaneously as the fines are drawn through the first channels, very hot exhaust gases are directed into second channels 43 which are in heat exchange or thermal communication with the first channels whereby the fine particles become heated without direct exposure to these hot gases. The hot exhaust or afterburner gas directed to the heating apparatus 20 is preferably clean and does not contain significant amounts of uncombusted hydrocarbon or other organic materials which would violate atmospheric pollution standards. It is important, according to the preferred embodiment, to keep the hot clean exhaust gas, which is greater than about 1000° F. and preferably about 1500° F. or so, from direct contact with the fines, which may contain significant amounts of volatilizable organic material. Thus, the heating apparatus 20 is constructed so as to maintain separation of the hot gases from the particulate fines as they pass through the heat exchanger in their respective first and second channels. To provide such separation, apparatus cover 48 is formed and/or provided with seals, gaskets, etc. to maintain gas sealed separation of the interior cavity 25 through which hot gas passes, from the cavity 22 through which the fines are directed. In addition, the aforesaid first and second channels of the heat exchanger are sealed to prevent contamination of the hot exhaust gas with particulate fines or volatilized contaminants. Thus, the surfaces forming the channels as well as the seams, joints, or connecting surfaces therebetween are provided with suitable seals, coatings, etc., capable of substantially avoiding such contamination.

The clean, hot afterburner exhaust gas may then be pulled from the heating apparatus 20 via pipe 23 and exhaust fan 21 and exhausted directly to atmosphere. In addition, the particulate fines heated in heating apparatus 20 may be directed through the apparatus gravitationally, or in any other suitable way, so long as they are sufficiently exposed to the heat therein. For example, a series of baffles, fins, trays or other inclined heat exchange surfaces 48 may be used, which provide efficient heat transfer from the hot exhaust gases to the particles. The surfaces shown are only examples of one heat transfer means that may be used in the apparatus. The apparatus may include means for vibrating the heat exchange surfaces for assisting in directing the particles through the apparatus. Other modifications to the apparatus for enhancing or improving heat exchange may also be used.

Once the particulate fines have been heated substantially in the heating apparatus 20 to the temperature at which the contaminant material is volatilized from the particles, the volatilized material may be pulled or directed from the apparatus via exhaust fan 21 and exhaust pipe 33, or similar means. The heated decontaminated particulates are conveniently directed to a recovery port at the bottom of the apparatus, and directed through a chute or conveyor 49. The recovered particulate fines are substantially free of the volatilizable contaminant material, and may be then mixed with the clean coarse particles recovered from drum 10 to achieve the final recovered product 40, as shown.

It may be preferred to direct the volatilizable organic material which has been separated from the fine particulates in the indirect heating apparatus 20 to a combustion furnace for creating further heat for use in the system. For example, in the embodiment illustrated in FIG. 1, exhaust pipe 33 directs the volatilized organic vapor from apparatus 20 to burner 12 as supplemental combustion fuel for heating the soil particulates in drum 10. As an alternative, the combustible organic material may be directed to furnace 34 and burned to provide heat to the apparatus 20. Such additional treatment of the combustible organic contaminants further reduces potentially undesirable atmospheric pollution.

The system and apparatus of the invention is constructed to maximize the advantage of using the organic or hydrocarbon gases for creating hot clean exhaust in after-burner furnace 34 to provide for heating the fines in heating apparatus 20. However, other means for heating the fines may be used, depending on the availability of primary or secondary heat and the invention is not limited to use of such exhaust gas for heating the fines in the system as shown. Accordingly, these as well as other modifications and advantages of the system within the scope of the invention will be evident to those skilled in the art.

I claim:

1. A process for treating particulate soil composition having volatilizable organic material therein, said particulate soil including a substantial portion of fine soil particles passing a size 40 U.S. series sieve, comprising:

heating said particulate soil composition in a rotating drum while passing hot gases of combustion comprising a mixture of said hot gases of combustion, volatilized organic material and said fine particles, separating said fine particles from said gaseous composition, directing said gaseous composition to a furnace and combusting said volatilized organic material therein, recovering at least a portion of hot exhaust gases from said furnace, and recovering said fine particles separated from said gaseous composition, and directing said recovered hot exhaust gases and recovered fine particles to a heat exchange apparatus having one or more first channels for directing said fine particles therethrough and one or more second channels in heat exchange communication with said first channels for directing said hot exhaust gases therethrough, heating said fine particles and volatilizing organic material therefrom in said heat exchange apparatus and wherein said fine particles and said hot exhaust gases are indirectly exposed in said heat exchange apparatus whereby contamination of said hot exhaust gases with volatilized organic material is avoided therein, and separating volatilized organic material from said fine particles, and recovering said fine particles.

2. A process of claim 1 including burning said volatilized organic material separated from said fine particles.

3. A process of claim 1 wherein volatilized organic material separated from said fine particles is directed to a burner for heating said particulate sol composition in said rotating drum.

4. A process of claim 1 wherein said fine particles are heated in said heat exchange apparatus to a temperature of about 400° F. or more.

5. A process of claim 1 wherein said fine particles are heated in said heat exchange apparatus to a temperature of about 500° F. or more.

6. A process of claim 4 wherein said portion of hot exhaust gas directed to said heat exchange apparatus has a temperature of at least about 1200° F.

7. A process of claim 1 wherein said fine particles are directed gravitationally through said heat exchange apparatus.

8. In a process for treating particulate soil composition having a substantial portion of fine particles passing a size 40 U.S. series sieve and containing volatilizable organic material therein, the improvement comprising:

providing an apparatus for volatilizing said organic material from said fine particles comprising one or more first channels for passing said fine particles therethrough and one or more second channels in heat exchange communication with said one or more first channels for passing hot gases therethrough, heating said fine particles in said apparatus to a temperature of at least about 400° F. by directing said fine particles through said first channels of said apparatus and simultaneously passing a hot gas having a temperature of at least about 1200° F. through said second channels and wherein said fine particles and said hot gas are indirectly exposed in said apparatus and whereby contamination of said hot gas with volatilized organic material in said apparatus is substantially avoided, and recovering said fine particles from said apparatus.

9. A process of claim 8 wherein said fine particles are directed through said first channels gravitationally.

* * * * *